(12) United States Patent
Bonev et al.

(10) Patent No.: US 7,725,505 B2
(45) Date of Patent: May 25, 2010

(54) SYSTEM AND METHOD FOR MEASURING MEMORY CONSUMPTION DIFFERENCES BETWEEN OBJECTS WITHIN AN OBJECT-ORIENTED PROGRAMMING ENVIRONMENT

(75) Inventors: Pavel Bonev, Sofia (BG); Georgi Stanev, Sofia (BG); Malden I. Droshev, Sofia (BG)

(73) Assignee: SAP AG, Walldorf (DE)

( * ) Notice: Subject to any disclaimer, the term of this patent is extended or adjusted under 35 U.S.C. 154(b) by 348 days.

(21) Appl. No.: 11/647,957

(22) Filed: Dec. 29, 2006

(65) Prior Publication Data

US 2008/0162547 A1    Jul. 3, 2008

(51) Int. Cl.
*G06F 12/00* (2006.01)
*G06F 17/00* (2006.01)
*G06F 17/30* (2006.01)

(52) U.S. Cl. .................. 707/814; 711/171; 717/155
(58) Field of Classification Search ............... 707/100, 707/206; 711/171; 717/155
See application file for complete search history.

(56) References Cited

U.S. PATENT DOCUMENTS

| | | | |
|---|---|---|---|
| 5,933,601 A | 8/1999 | Fanshier et al. | |
| 5,966,127 A | 10/1999 | Yajima | |
| 7,444,644 B1 | 10/2008 | Slaughter et al. | |
| 2003/0135503 A1 | 7/2003 | Goldberg et al. | |
| 2004/0133759 A1* | 7/2004 | Sekiguchi | 711/170 |
| 2004/0181782 A1* | 9/2004 | Findeisen | 717/130 |
| 2005/0086656 A1 | 4/2005 | Whitlock et al. | |
| 2005/0182844 A1 | 8/2005 | Johnson et al. | |
| 2006/0212852 A1* | 9/2006 | Hwang | 717/127 |
| 2006/0235810 A1 | 10/2006 | Wen et al. | |
| 2006/0271586 A1 | 11/2006 | Federighi et al. | |
| 2007/0118538 A1 | 5/2007 | Ahern et al. | |
| 2007/0195959 A1 | 8/2007 | Clarke | |
| 2007/0226683 A1* | 9/2007 | Stoodley et al. | 717/106 |
| 2007/0261043 A1* | 11/2007 | Ho et al. | 717/151 |
| 2008/0162552 A1 | 7/2008 | Bonev | |
| 2008/0163063 A1 | 7/2008 | Bonev | |
| 2008/0163124 A1 | 7/2008 | Bonev | |

OTHER PUBLICATIONS

"Beginning Java 2," Horton, Ivor, WROX Press, 1999, pp. 36, 40, 58, and 66.*
Kirby, Graham, et al., "OCB: An Object/Class Browser for Java", Proceedings of the Second International Workshop on Persistence and Java (PJW2), Retrieved from the Internet: URL:http://ftp.ncnu.edu.tw/JavaDownload/Docs/Persistence/Com.sun.labs.forest.pjava.pjw2_pdf.pdf, xp002478205., (Aug. 1997), 89-105.

(Continued)

*Primary Examiner*—James Trujillo
*Assistant Examiner*—Bruce M. Moser
(74) *Attorney, Agent, or Firm*—Schwegman, Lundberg & Woessner, P.A.

(57) ABSTRACT

A computer-implemented system and method are described for measuring the memory consumption difference between two objects in an object-oriented programming environment. For example, one embodiment of a method comprises: analyzing relationships between objects within a network of objects to determine an object network structure; generating object graph data representing the object network structure, the object graph data including nodes representing objects and arcs representing relationships between objects; removing all incoming arcs to each of two nodes; building resulting sub-graphs for each of the two nodes; summing the memory consumed by each of the sub-graphs of the two nodes; and subtracting the memory amounts consumed by each of the sub-graphs to determine the memory consumption different between the two nodes.

21 Claims, 16 Drawing Sheets

OTHER PUBLICATIONS

Mitchell, Nick, "The Runtime Structure of Object Ownership", Object-Oriented Programming Lecture Notes in Computer Science, ECOOP, LNCS, Springer-Verlag Berlin Heidelberg, XP019041424, ISBN: 978-3-540-35726-1, (Sep. 2006), 74-98.

Potanin, Alex, et al., "Scale-Free Geometry in OO Programs", Communications of the ACM, XP002478203, ISSN: 0001-0782, (May 2005), 99-103.

Zimmermann, Thomas, et al., "Visualizing Memory Graphs", Springer-Verlag Berlin Heidelberg, XP002478204, S. Diehl (Ed): Software Visualization, LNCS 2269, (2002), 191-204.

PCT Search Report mailed May 16, 2008, 4 Pages.

Written Opinion mailed May 16, 2008, 6 Pages.

"U.S. Appl. No. 11/647,979, Final Office Action mailed Jul. 8, 2009", 11 pgs.

"U.S. Appl. No. 11/647,979, Final Office Action mailed Oct. 2, 2009", 11 pgs.

"U.S. Appl. No. 11/647,979, Non-Final Office Action mailed Feb. 19, 2009", 7 pgs.

"U.S. Appl. No. 11/647,979, Non-Final Office Action mailed Feb. 2, 2010", 9 pgs.

"U.S. Appl. No. 11/647,979, Response filed Apr. 8, 20009 to Non Final Office Action mailed Feb. 19, 2009", 14 pgs.

"U.S. Appl. No. 11/647,979, Response filed Sep. 9, 2009 to Final Office Action mailed Jul. 8, 2009", 12 pgs.

"U.S. Appl. No. 11/647,979, Response filed Dec. 22, 20009 to Non Final Office Action mailed Oct. 2, 2009", 15 pgs.

"U.S. Appl. No. 11/647,982, Non-Final Office Action mailed Nov. 12, 2009", 8 pgs.

"U.S. Appl. No. 11/647,982, Final Office Action mailed Jun. 29, 2009", 9 pgs.

"U.S. Appl. No. 11/647,982, Non Final Office Action mailed Feb. 27, 2009", 8 pgs.

"U.S. Appl. No. 11/647,982, Response filed 02-05-10 to Non Final Office Action mailed Nov. 12, 2009", 11 pgs.

"U.S. Appl. No. 11/647,982, Response filed Apr. 8, 2009 to Non Final Office Action mailed Feb. 27, 2009", 13 pgs.

"U.S. Appl. No. 11/647,982, Response filed Aug. 20, 2009 to Final Office Action mailed Jun. 29, 2009", 9 pgs.

"U.S. Appl. No. 11/647,982, Response filed Sep. 23, 2009 to Advisory Action mailed Sep. 10, 2009", 10 pgs.

"International Application Serial No. PCT/EP2007/010882, International Search Report & Written Opinion dated Jul. 5, 2008", 10 pgs.

"International Application Serial No. PCT/EP2007/010883, International Search Report mailed May 6, 2008", 4 pgs.

"International Application Serial No. PCT/EP2007/010883, Written Opinion mailed May 0608", 6 pgs.

De Pauw, W, et al., "Web Services Navigator: Visualizing the Execution of Web Services", *IBM Systems Journal, vol. 44, No. 4*, (2005), 821-845.

De Pauw, Wim, et al., "Visualizing the Execution of Java Programs", *Software Visualization, International Seminar, Revised Papers, Lecture Notes in Computer Science, vol. 2269*, XP002477230, ISBN: 3-540-43323-6, (2002), 151-162.

Gilberg, R. F., "Data Structures: A Pseudocode Approach with C", *Thomson Course Technology 310340*, XP002477259, (May 31, 2006), 488-491.

Salah, Maher M., "An Environment for Comprehending the Behavior of Software Systems", *Drexel University*, XP002477233, (Jun. 2005), 1-158.

Smith, M. P., et al., "Providing a User Customizable Tool for Software Visualization at Runtime", *Fourth lasted International Conference on Visualization, Imaging, and Image Processing Acta Press*, XP002477257, ISBN: 0-88986-454-3, (2004), 135-140.

Smith, M. P., et al., "Runtime Visualisation of Object Oriented Software", *Proceedings First International Workshop on Visualising Software for Understanding and Analysis*, XP002477258, ISBN: 0-7695-1662-9, (2002), 81-89.

Smith, Michael P., et al., "Identifying Structural Features of Java Programs by Analysing the Interaction of Classes at Runtime", *2005 3rd IEEE International Workshop on Visualizing Software for Understanding and Analysis (IEEE Cat. No. 05EX1225)*, XP002477232, ISBN: 0-7803-9540-9, (2005), 108-113.

\* cited by examiner

SYSTEM AND METHOD FOR MEASURING MEMORY CONSUMPTION DIFFERENCES BETWEEN OBJECTS WITHIN AN OBJECT-ORIENTED PROGRAMMING ENVIRONMENT

BACKGROUND

1. Field of the Invention

This invention relates generally to the field of data processing systems. More particularly, the invention relates to a system and method for measuring memory consumption differences between objects within an object-oriented programming environment.

2. Description of the Related Art

Multi-Tiered Enterprise Computing Systems

Traditional client-server systems employed a two-tiered architecture such as that illustrated in FIG. 1a. Applications 102 executed on the client side 100 of the two-tiered architecture are comprised of a monolithic set of program code including a graphical user interface component, presentation logic, business logic and a network interface that enables the client 100 to communicate over a network 103 with one or more servers 101. A database 104 maintained on the server 101 provides non-volatile or "persistent" storage for the data accessed and/or processed by the application 102.

The "business logic" component of the application represents the core program code of the application, i.e., the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1a become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 1b. In the multi-tiered system, the presentation logic 121, business logic 122 and database 123 are logically separated from the user interface 120 of the application. These layers are moved off of the client 125 to one or more dedicated servers on the network 103. For example, the presentation logic 121, the business logic 122, and the database 123 may each be maintained on separate servers, 126, 127 and 128, respectively.

This separation of logical components and the user interface provides a more flexible and scalable architecture compared to that provided by the two-tier model. For example, the separation ensures that all clients 125 share a single implementation of business logic 122. If business rules change, changing the current implementation of business logic 122 to a new version may not require updating any client-side program code. In addition, presentation logic 121 may be provided which generates code for a variety of different user interfaces 120, which may be standard browsers such as Internet Explorer® or Netscape Navigator®.

The multi-tiered architecture illustrated in FIG. 1b may be implemented using a variety of different application technologies at each of the layers of the multi-tier architecture, including those based on the Java 2 Enterprise Edition™ ("J2EE") standard, the Microsoft.NET standard and/or the Advanced Business Application Programming ("ABAP") standard developed by SAP AG. For example, as described below, in a J2EE environment, the business layer 122, which handles the core business logic of the application, is comprised of Enterprise Java Bean ("EJB") components with support for EJB containers. Within a J2EE environment, the presentation layer 121 is responsible for generating servlets and Java Server Pages ("JSP") interpretable by different types of browsers at the user interface layer 120.

J2EE Application Server Architecture

FIG. 2 illustrates a typical J2EE application server 200 in which the presentation layer is implemented by a "Web container" 211 and the business layer is implemented by an Enterprise Java Bean ("EJB") container 201. Containers are runtime environments which provide standard common services 219, 209 to runtime components. For example, the Java Naming and Directory Interface ("JNDI") is a service that provides application components with methods for performing standard naming and directory services. Containers also provide unified access to enterprise information systems 217 such as relational databases through the Java Database Connectivity ("JDBC") service, and legacy computer systems through the J2EE Connector Architecture ("JCA") service. In addition, containers provide a declarative mechanism for configuring application components at deployment time through the use of deployment descriptors.

As illustrated in FIG. 2, each layer of the J2EE architecture includes multiple containers. The Web container 211, for example, is itself comprised of a servlet container 215 for processing servlets and a Java Server Pages ("JSP") container 216 for processing Java server pages. The EJB container 201 includes three different containers for supporting three different types of enterprise Java beans: a session bean container 205 for session beans, an entity bean container 206 for entity beans, and a message driven bean container 207 for message driven beans. A more detailed description of J2EE containers and J2EE services can be found in RAGAE GHALY AND KRISHNA KOTHAPALLI, SAMS TEACH YOURSELF EJB IN 21 DAYS (2003) (see, e.g., pages 353-376).

Object-Oriented Computer Systems

The computer systems described above consist of many smaller pieces of program code referred to as "objects" which interact each other. For example in a computer program for booking cars at least three objects are required for storing the relevant information: one for the person who makes the booking (name, credit card number etc), one for the booked car (model, engine, class, etc) and another for the booking itself (booking date, return date, etc).

In most cases, objects reference other objects to form very complex object networks. Sometimes information about the structure of an object network is needed without knowledge about the real data and semantics of the objects in the network. By way of analogy, within a genealogic tree, to determine structural data such as how many people are linked, how clustered the tree is, etc, it is not necessary to know the details about each person—just the properties of the network itself.

For that purpose, a consistent, flexible way to represent the object network structure would be desirable.

SUMMARY

A computer-implemented system and method are described for measuring the memory consumption difference between two objects in an object-oriented programming environment. For example, one embodiment of a method comprises: analyzing relationships between objects within a network of objects to determine an object network structure; generating object graph data representing the object network structure, the object graph data including nodes representing objects and arcs representing relationships between objects; removing all incoming arcs to each of two nodes; building resulting sub-graphs for each of the two nodes; summing the memory consumed by each of the sub-graphs of the two nodes; and subtracting the memory amounts consumed by each of the sub-graphs to determine the memory consumption different between the two nodes.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below is a system and method for processing object graphs. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

A. System and Method for Processing Object Graphs

Figure 1A:
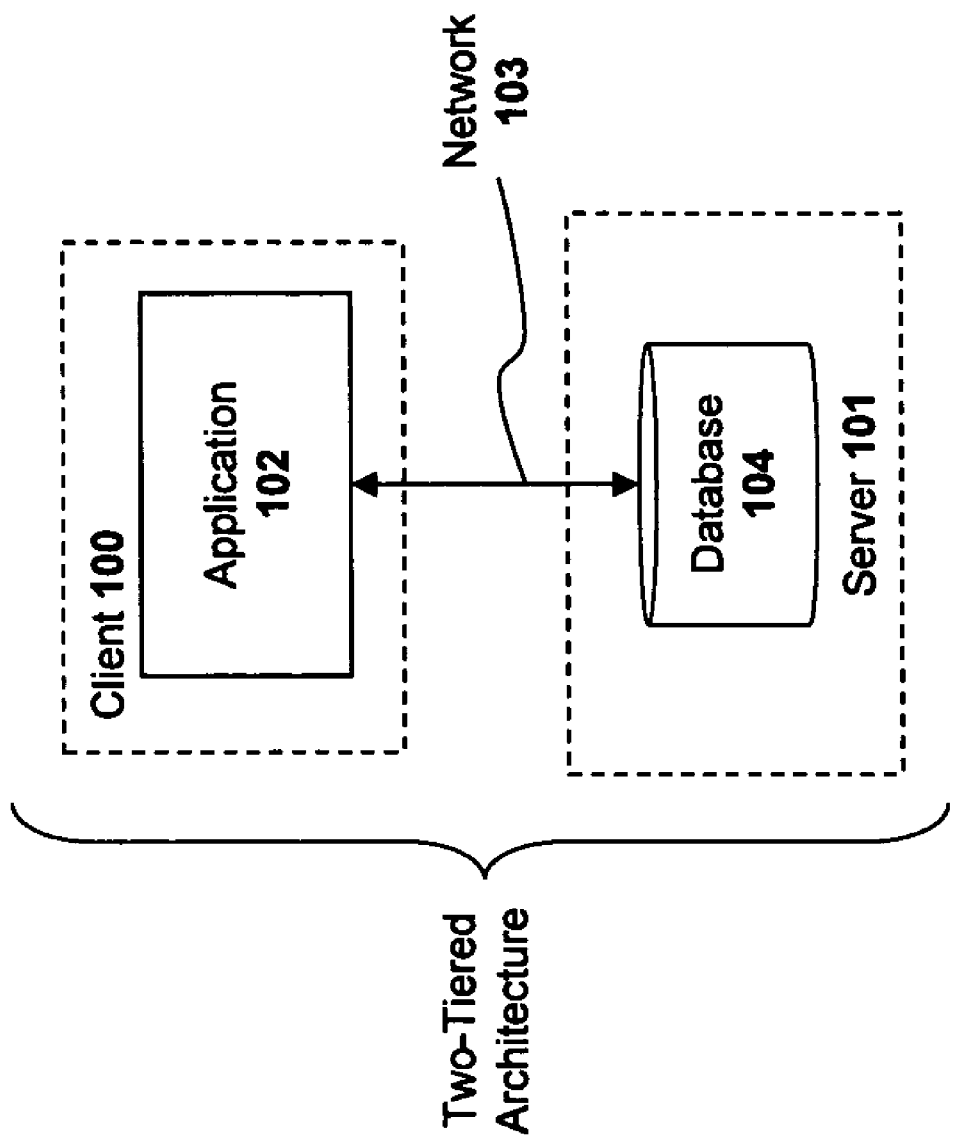
FIG. 1a illustrates a traditional two-tier client-server architecture.
Figure 1B:
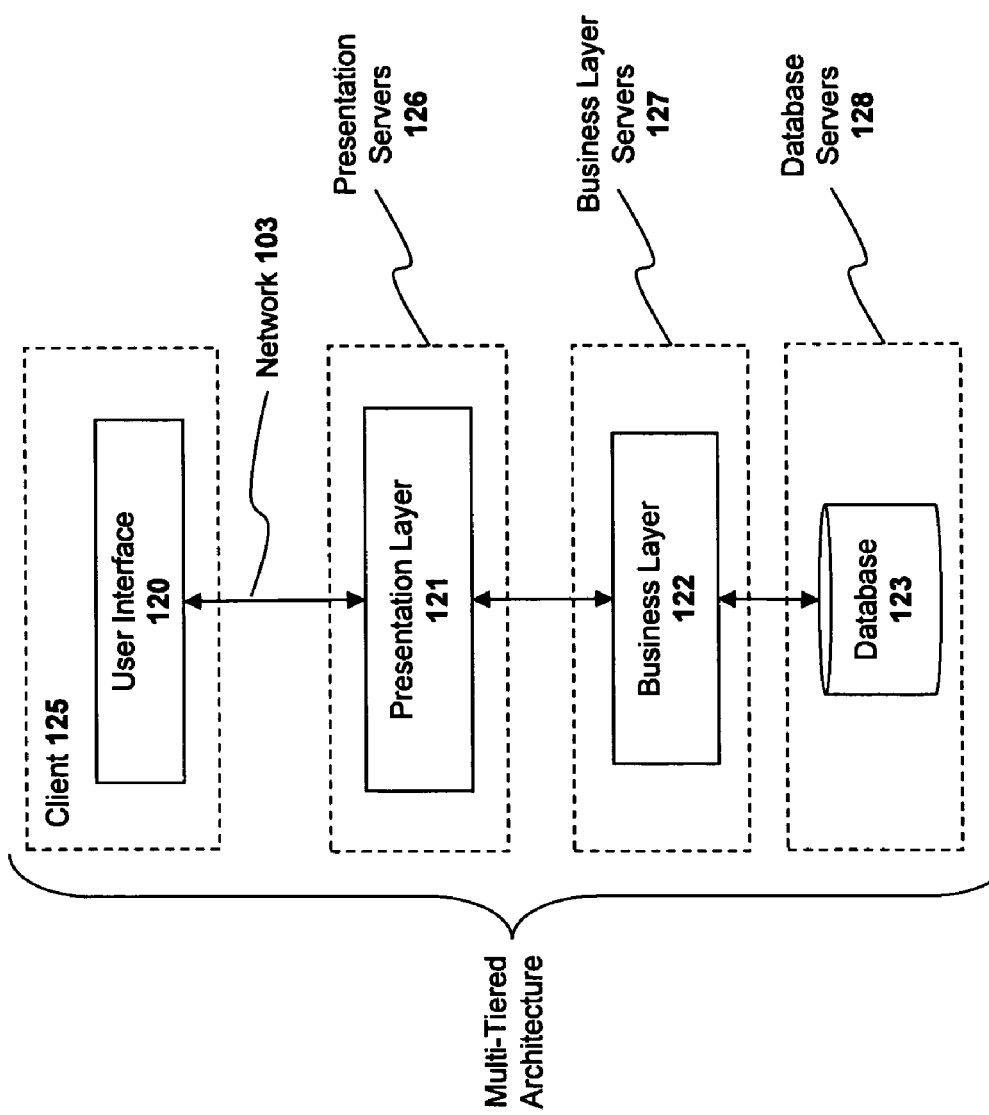
FIG. 1b illustrates a prior art multi-tier client-server architecture.
Figure 2:
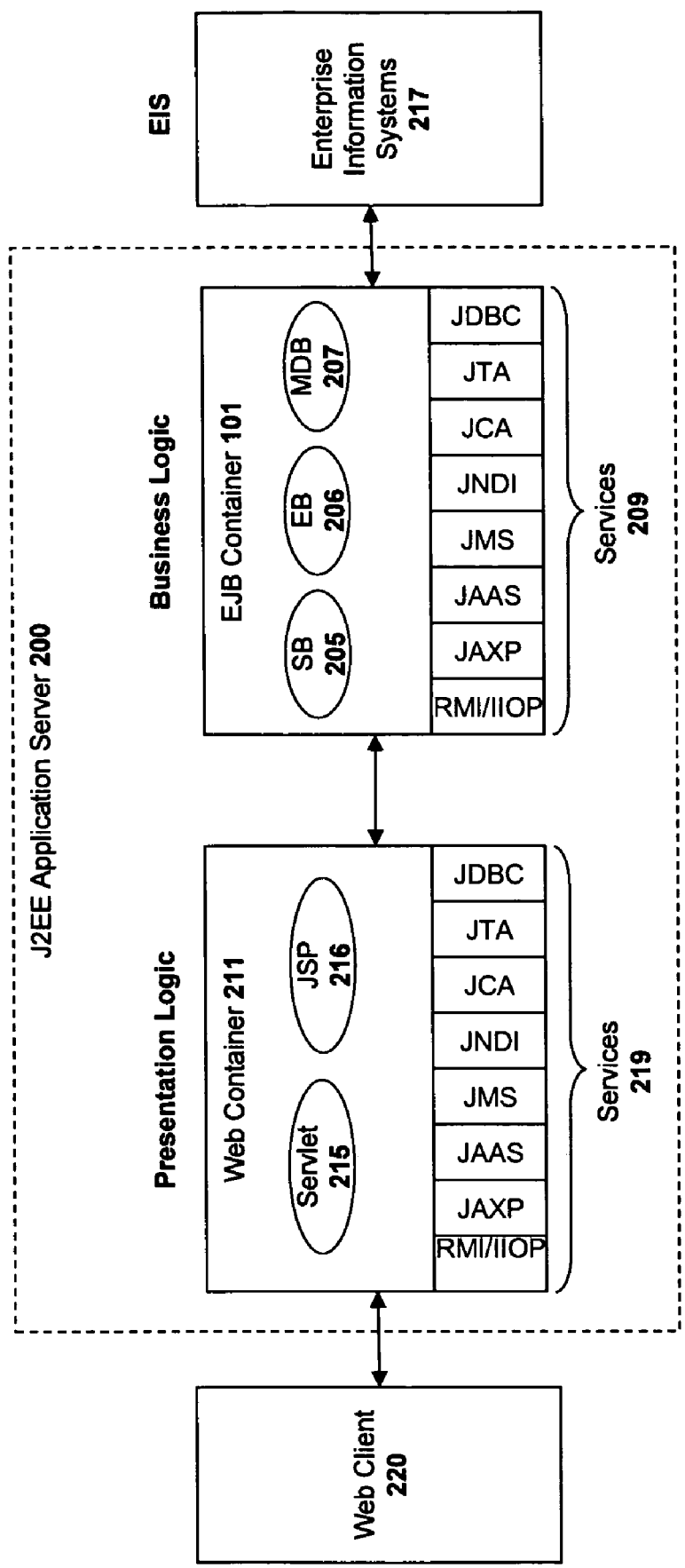
FIG. 2 illustrates a multi-tiered application server architecture according to the Java 2 Enterprise Edition ("J2EE") standard.
Figure 3:
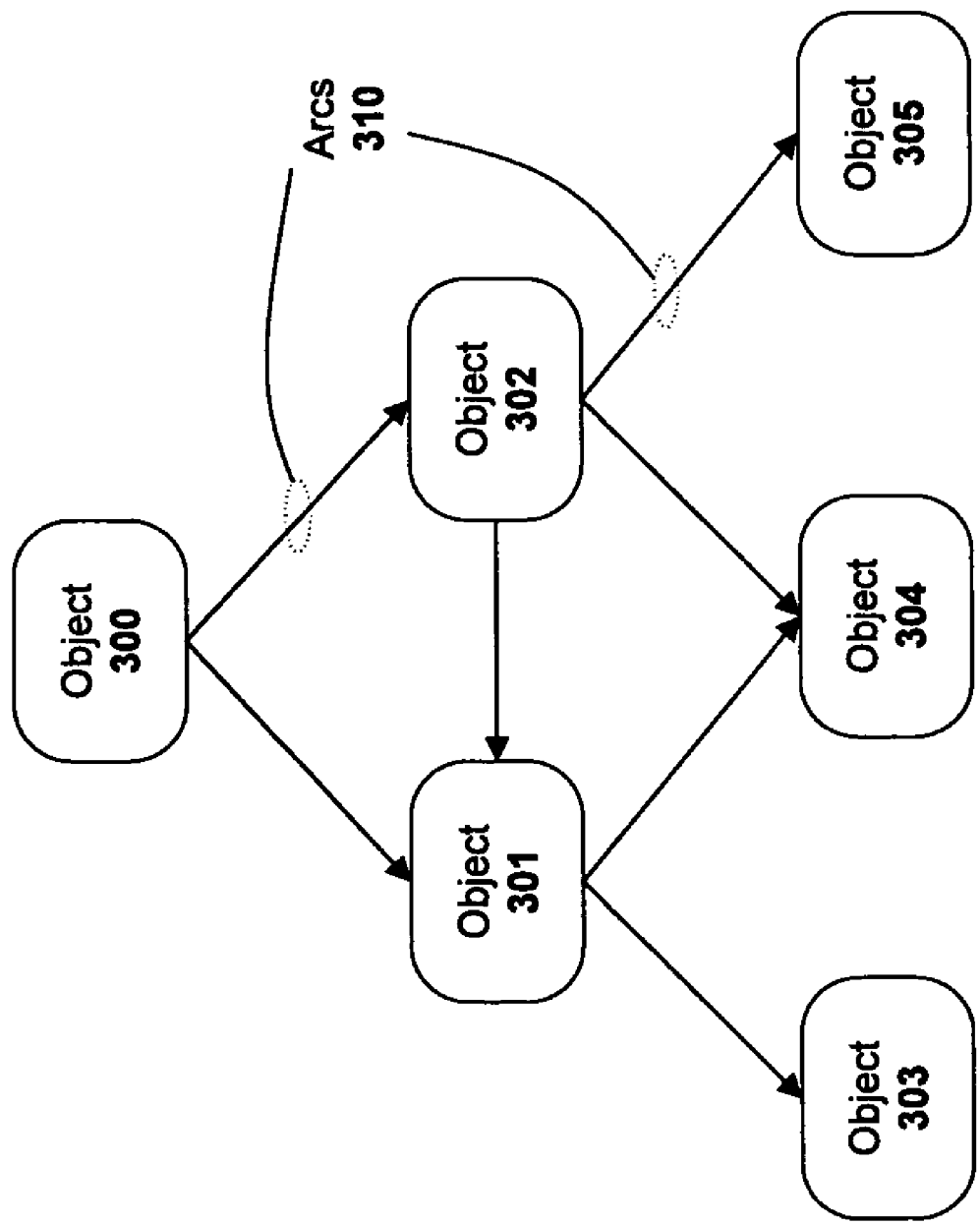
FIG. 3 illustrates an exemplary object graph structure.

FIG. 3 illustrates an exemplary network of objects 300-305 which will be used to describe the various embodiments of the invention. Each of the objects may contain different types of data and methods. In the illustrated example, object 300 references objects 301 and 302. For example, object 300 points to objects 301 and 302 (e.g., object 300 may include object 301, 302 instances as its properties). The contained object state is part of the state of the object-container. Similarly, object 302 references objects 301 and 304-305 and object 301 references objects 303-304.

As mentioned above, information about the structure of an object network such as the one shown in FIG. 3 may be needed without the need for the data and semantics of the objects themselves. For example, information related to how each of the objects reference one another may be needed rather than the underlying data contained within the objects. In these situations, it is inefficient to transfer all of the data when all that is required is information related to the relationships between the objects.

To address these needs, one embodiment of the invention analyzes object oriented program code and generates a math graph structure to represent the object network. The math graph structure may then be viewed within a visualization tool and/or stored within a mass storage device (as described below). The graph structure consists of one or many "nodes," each of which represents an object, and zero or many "arcs" (such as arcs 310) between the nodes. In an embodiment which uses Java program code (or a similar type of program code), an oriented graph is used because Java object "has a" relationships are parent-child relationships (e.g., a car "has a" make, model, year, and engine). In this embodiment, every object in computer memory is represented by one graph node and every object-to-object relationship is represented by one arc.

Figure 4:
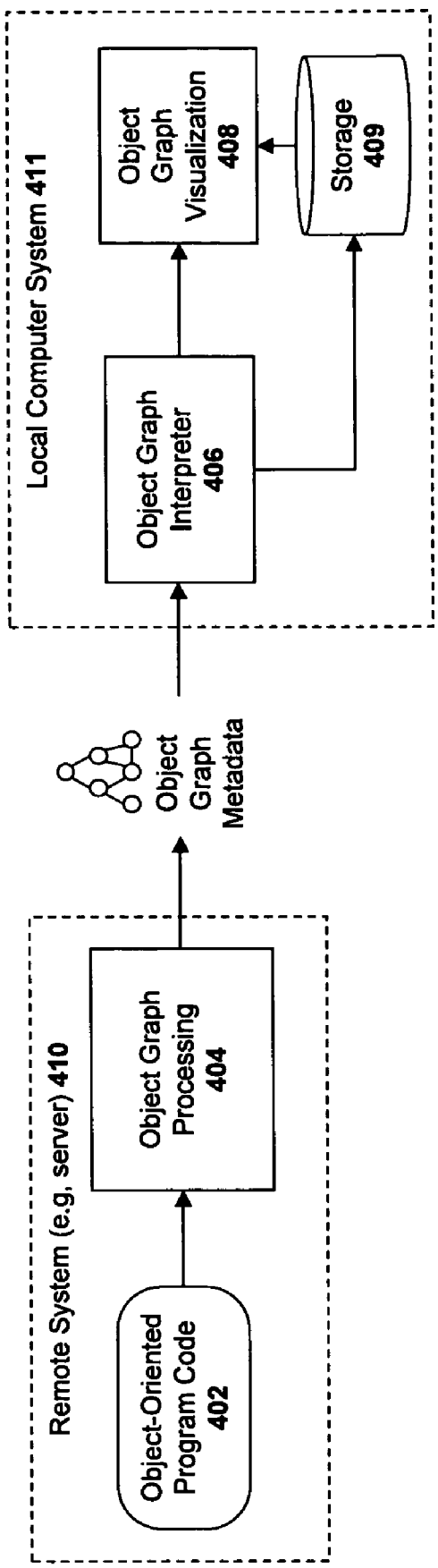
FIG. 4 illustrates an architecture for processing object graph data according to one embodiment of the invention.

FIG. 4 illustrates one embodiment of an architecture for performing the foregoing operations. A local computer system 411 requests object graph information related to object-oriented program code 402 executed on a remote computer system 410. An object graph processing service 404 extracts information from the object-oriented program code 402 to generate the object graph and other types of data described herein. The object graph and other data are then transmitted over a network to the requesting computer system 411.

Object graph interpreter logic 406 on the requesting computer system 411 interprets the serialized object graph and other data to graphically display the results within an object graph graphical user interface 408 sometimes referred to herein as a "visualization tool" (such as the one described below). In addition, the object graph and other data may be stored within a storage medium 409 such as a file system or database for later retrieval and viewing.

In one embodiment, the object graph processing logic 404 generates and/or collects additional information about objects (nodes) and references (arcs) and transmits the additional information with the object graph information. For example, in one embodiment, the following additional information is generated and/or collected:

1. The "memory size" of each object. This is the relative amount of random access memory consumed by each object. In one embodiment, the object graph processing logic 404 calculates the memory size in terms of a weighted value rather than an absolute value. In one particular implementation, a different weighted value is assigned to each of the generic types within the object (e.g., based on the relative memory consumption of those types). For example, an integer (INT) may be assigned a weight of 4 whereas a Boolean type may be assigned a weight of 1. Various other weights may be assigned to other generic types including, for example, char, float, double, byte, short, long and string. In one embodiment, the following weights are assigned to each of the generic types: boolean=1 byte; byte=1 byte; char=2 bytes; short=2 bytes; int=4 bytes; long=8 bytes; float=4 bytes; double=8 bytes.

2. The name of the Java type (i.e., the class).
3. The object's unique identification code for the graph structure. In one embodiment, the object graph processing logic 404 assigns each object an integer value which uniquely identifies the object within the graph structure.
4. An indication as to whether the object is serializable in Java terms. As it is known in the art, a "serializable" object may be converted to a bit stream and transmitted over a network.
5. An indication as to whether the object is shareable. Certain computer systems designed by the assignee of the present application allow objects to be shared among multiple Java virtual machines (as described below). Thus, objects in these systems may be designated "shareable" or "non-shareable."

In addition, the following information is generated and/or collected for each of the references:

1. The reference name (i.e., the class field name).
2. An indication as to whether the reference is a transient field in Java terms. As is known in the art, a "transient" field is one which is neither serialized or persisted.
3. The identity of two nodes initiating this relationship (i.e., the parent and child nodes). In one embodiment, this is accomplished using the objects' unique identification codes mentioned above.

The graph structure and additional information related to the object network are then serialized and transmitted as metadata to a requesting client. This is advantageous because the graph structure and additional information can be observed as any other graph object using various different types of graph visualization tools. It can also be transmitted over a network such as the Internet (without sending the actual objects and data). It may also be saved on disk in a specified file type (e.g., a text/XML file) or as a Java serialized object file for later observation.

The object graph processing logic 404 may format and store the object graph data is a variety of ways while still complying with the underlying principles of the invention. For example, both list structures and matrix structures may be used, or a combination of both. List structures are often used for sparse graphs as they have smaller memory requirements whereas matrix structures provide faster access but may consume significant amounts of memory if the graph is very large.

List structure types may include an incidence list structure or an adjacency list structure. In an incidence list structure, the edges are represented by an array containing pairs (ordered if directed) of nodes (that the edge connects) and eventually weight and other data. In an adjacency list structure, each node (also sometimes referred to as a "vertex") has a list of which vertices it is adjacent to. This causes redundancy in an undirected graph: for example, if vertices A and B are adjacent, A's adjacency list contains B, while B's list contains A. Adjacency queries are faster, at the cost of extra storage space.

Matrix structures may include an incidence matrix structure in which the graph is represented by a matrix of E (edges) by V (vertices), where [edge, vertex] contains the edge's data and/or an adjacency matrix which is an N by N matrix, where N is the number of vertices in the graph. If there is an edge from some vertex X to some vertex Y, then the element $M_{x,y}$ is 1; otherwise it is 0. This type of matrix makes it easier to locate subgraphs, and to reverse graphs if needed. Other possible matrix types include a Laplacian matrix, Kirchhoff matrix, admittance matrix and a distance matrix.

It should be noted that the underlying principles of the invention are not limited to any particular format for the object graph data or to the specific architecture shown in FIG. 4. For example, the "remote" system and "local" system do not necessarily need to be located in separate locations or on separate machines.

B. A Graphical User Interface for Object Graphs

Figure 5:
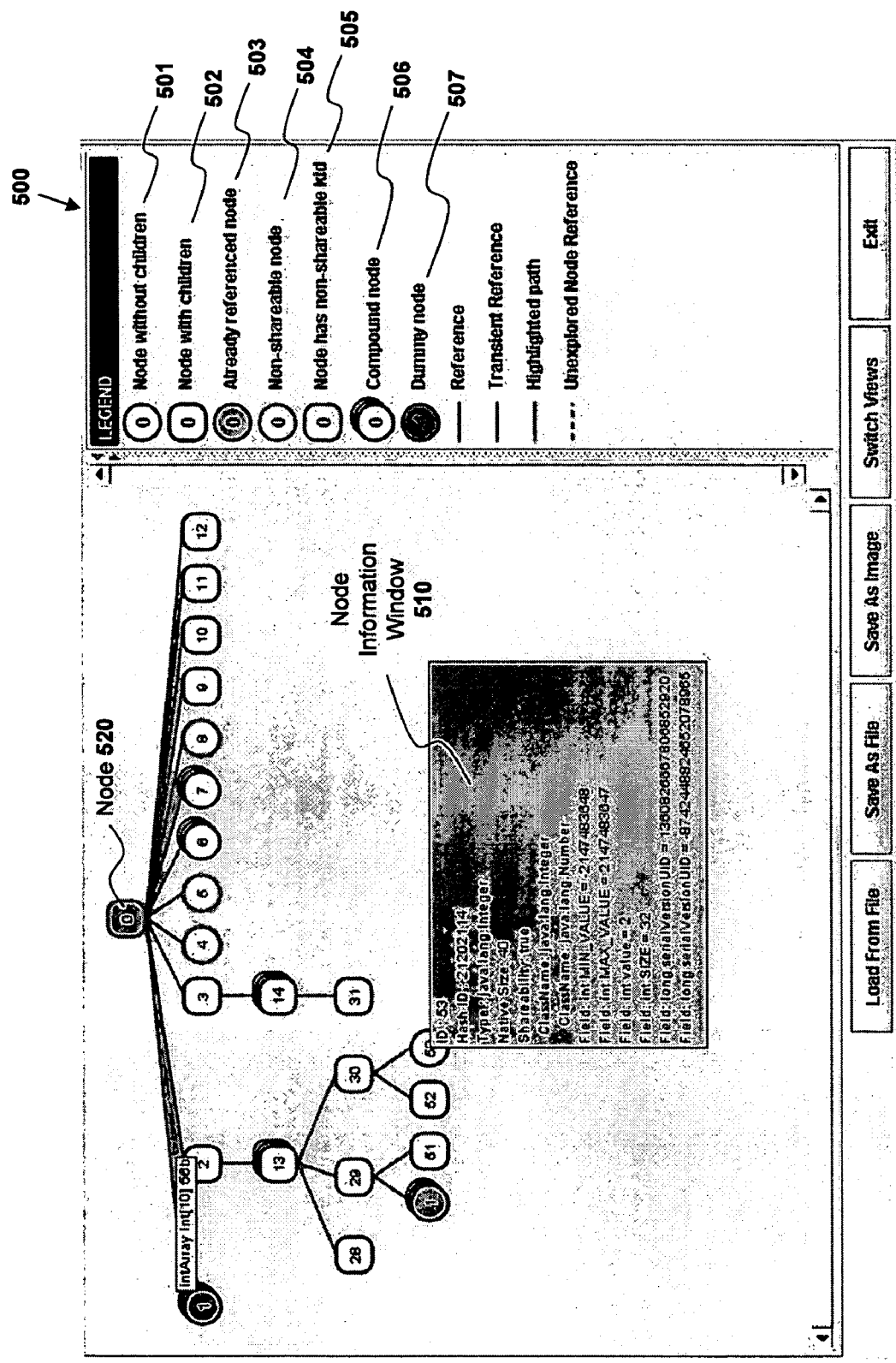
FIG. 5 illustrates a graphical user interface according to one embodiment of the invention.

After retrieving the object graph and other data associated with objects on the remote computer system, one embodiment of the invention employs a unique graphical visualization tool to observe the object graph and data. One embodiment of a visualization tool 408 is illustrated in FIG. 5. In this embodiment, in response to user-selection of a particular node 520 (e.g., via a mouse or other cursor control device), the graph is drawn as a tree using the selected node 520 as the root. In one embodiment, the visualization tool 408 renders each of the child nodes further up in the hierarchy before their children (i.e., it employs a breadth-first scan). However, the underlying principles of the invention are not limited to the order in which the nodes are rendered. If a node is referenced more than once the visualization tool 408 renders it each time as a child node but does not traverse its sub-tree more than once. One reason for this is that it avoids cyclic dependencies and potentially endless drawing.

As illustrated in FIG. 5, in one embodiment of the visualization tool 408 employs different shapes, colors and graphics to indicate different types of nodes and arcs. For example, in one embodiment, the visualization tool uses a different filling color for nodes referenced once or many times. In FIG. 5, an orange filling color is used to identify nodes referenced mode than once, as indicated by entry 503 in the legend window 500, and a yellow filling color is used to identify nodes referenced only once.

In addition, as indicated in the legend window 500, a green filing color is used to identify "dummy" nodes 507. Dummy nodes are used to improve system performance when working with extremely large graphs. For example, a particular object graph may be very large (e.g., over 1 Gbyte) and may include hundreds of thousands of nodes. In this case, it may take a significant amount of time to traverse and render the entire graph. As such, in one embodiment, when a certain number of nodes have been traversed (e.g., 10,000), the object graph processing logic 404 and/or the visualization tool 408 may stop rendering and insert dummy nodes at the lowest level of the graph structure. The remainder of the graph structure may be drawn upon user request (e.g., by selecting one or more of the dummy nodes).

In one embodiment, different shapes are used to distinguish between nodes with and without children. In the specific example shown in FIG. 5, nodes without children are circular, as indicated by legend entry 501, and nodes with children are square with curved corners, as indicated by legend entry 502.

In addition, in the illustrated embodiment, different shape contour colors are used to mark nodes having different properties. For example, a light red contour color is used for nodes which are not shareable, as indicated by legend entry 504, and a dark red contour color is used for nodes which have children which are non-shareable, as indicated by legend entry 505. Various different contour colors may be used to identify different node properties (e.g., serializable nodes may be assigned another contour color). Of course, the underlying principles of the invention are not limited to any particular shapes and/or colors.

In addition, in the embodiment shown in FIG. 5, the visualization tool 408 uses a graphic indicating multiple overlayed nodes for "compound" nodes. As used herein, a compound node is an array of nodes of the same type (class).

In one embodiment, the visualization tool 408 appends a label on each node. In the example shown in FIG. 5, the label comprises the identification code assigned to each node. However, various other and/or additional information may be displayed including, for example, the node weight and/or the percentage of the node's parent weight.

In one embodiment, the visualization tool 408 generates the tree dynamically, in response to user input. For example, the visualization tool 408 may expand/collapse the tree upon selection of a node. In addition, in one embodiment, the visualization tool 408 skips certain nodes which do not meet a user-specified criteria (e.g., displaying only nodes which are not shareable). In one embodiment, the visualization tool 408 skips nodes from a given type (class) (class fields with a given name, etc).

In one embodiment, the visualization tool 408 displays the additional data collected for each node in response to user input. For example, in FIG. 5, a node information window 510 is generated when the user moves a cursor over a particular node. The node information window 510 may include any of the information described herein including, for example, the node ID, the type, the relative weight (i.e., "Native Size"), and whether the node is shareable.

As mentioned above, in one embodiment, additional metadata related to each of the object references is generated and/or collected such as the reference name (i.e., the class field name); an indication as to whether the reference is a transient field in Java terms; and the identity of two nodes initiating this relationship. This information may then be visually displayed within the visualization tool. For example, as indicated in FIG. 5, lines representing transient references may be provided in a different color than those for standard references. Various other graphical features may be employed to convey information about object relationships (e.g., such as a dotted line for unexplored node references).

C. Session and Cache Object Networks

The assignee of the present application has developed advanced, hierarchical architectures for managing session objects and cache objects. See, e.g., Session Management Within a Multi-Tiered Enterprise Network, Ser. No. 11/025,200, Filed Dec. 28, 2004, for session object management and Distributed Cache Architecture, Ser. No. 11/025,714, Filed Dec. 28, 2005, for cache management. Each of these co-pending patent applications is assigned to the assignee of the present application and is incorporated herein by reference.

The following discussion will focus on embodiments related to session objects and data but the same general principles apply equally to cache objects and data. An application server manages session data associated with each client interaction. The session data defines the current conversational state between the client and the application server. For example, if the user is purchasing books from an online bookstore, the session data may define the current state of the user's "shopping cart" (e.g., the books the user has selected for purchase). Similarly, if the user is logged in to a particular Web portal (e.g., "My Yahoo"), the session data may define the state of the Web pages opened in the user's Web browser.

Figure 6:
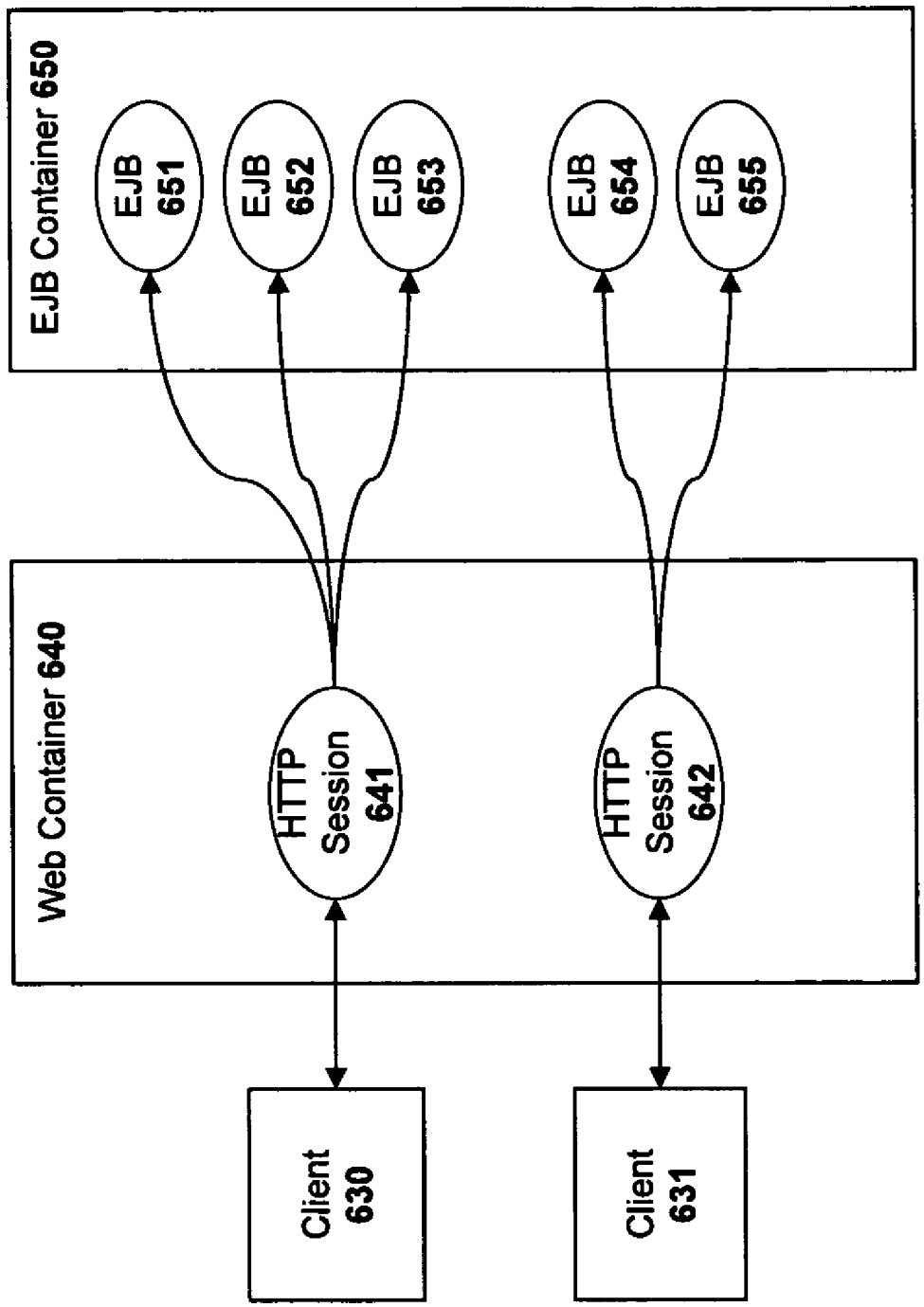
FIG. 6 illustrates session data within a prior art J2EE application server architecture.

In one embodiment, different types of session data are maintained at each logical layer of the application server. For example, referring to FIG. 6, in response to a single client 630 request from a Web browser, an HTTP session object 641 (e.g., an instance of javax.servlet.HttpSession) containing HTTP session data is managed within the Web container 640 and (depending on the type of application) multiple session beans 651-653 may be managed within the EJB container 650. Additional HTTP session objects 642 and session beans 654-655 may be managed concurrently to define the conversational state with additional clients 631 for the same application (e.g., the shopping cart application) or other applications (e.g., a "search" application). Thus, the state of any given set of applications such as the user's shopping cart may be spread across multiple containers.

Figure 7:
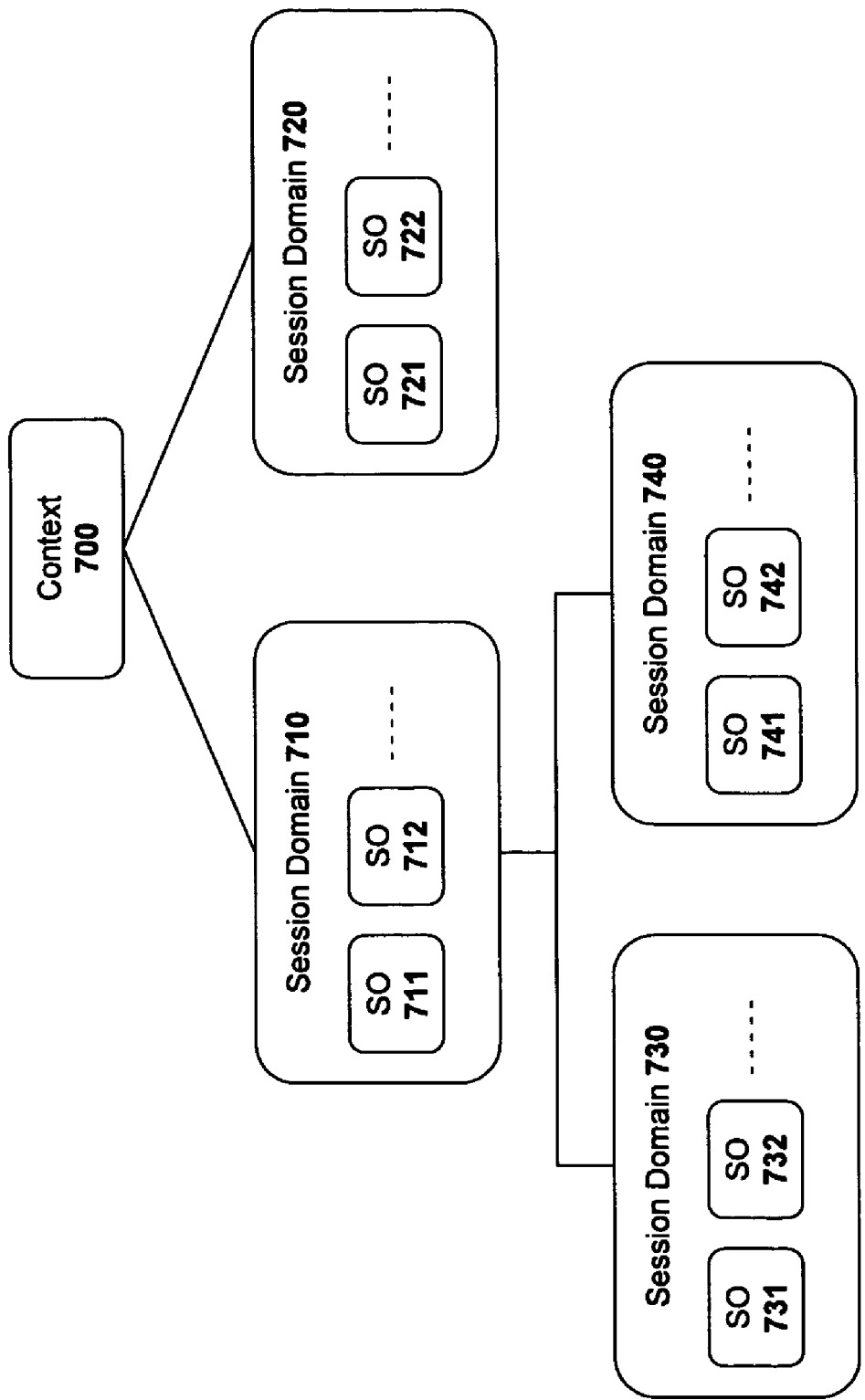
FIG. 7 illustrates a hierarchical session domain architecture according to one embodiment of the invention.

One embodiment of the invention employs session management logic employs a hierarchical structure for storing different types of related session data within each enterprise application (e.g., HTTP sessions, session EJBs, etc). In particular, as illustrated in FIG. 7, one embodiment of the session management layer groups related session objects within a logical hierarchy. At the top of the hierarchy is a session context object 700. "Session domains" are the base configurable objects within the session hierarchy and are positioned beneath the session context 700. The session domains represent abstract storage units for sessions that have similar characteristics (e.g., similar life cycles, applications, etc).

In the example shown in FIG. 7, session objects 711 and 712 are managed within session domain 710, and session objects 721 and 722 are managed within session domain 720. Both session domains 710 and 720 are positioned directly beneath the session context 700. In one embodiment, each session domain 710 and 720 contains session objects related to different applications. For example, session domain 710 may contain session objects related to a "shopping cart" application and session domain 720 may contain session objects related to a "calculator" application.

Two additional session domains 730 and 740 are logically positioned beneath session domain 710 within the hierarchy. In one embodiment, these session domains 730 and 740 include session objects 731, 732 and 741, 742, respectively, from the same application associated with session domain 710. Returning to the previous example, if session domain 710 is associated with a shopping cart application, session domains 730 and 740 include session objects related to the shopping cart application.

In one embodiment, a different session context 700 and associated hierarchy of session domains is maintained by session management logic for each layer of the application server. This embodiment will be described using the example illustrated in FIG. 8 in which a plurality of session objects are managed for two different applications, identified as applications "A" and "B." The conversational state between client 830 and application A is maintained via three session bean objects 801-803 within the EJB container 842; an HTTP session object 811 within the Web container 840; and two portal session objects 820-821 within the enterprise portal container. Similarly, the conversational state between client 831 and application A is maintained via two session bean objects 804, 806, one HTTP session object 812, and one portal session object 822. Finally, the conversational state between client 832 and application B is maintained via two session bean objects 807-808, one HTTP session object 813, and one portal session object 823.

In the illustrated example, session bean objects 801 and 804 are instances of a particular session bean, "EJB A," and session bean objects 802 and 806 are instances of another session bean, "EJB B." Session bean objects 803, 807 and 808 are instances of session beans C, D and E, respectively.

In one embodiment, the enterprise portal container 841 is built on top of the Web container 840. As illustrated, a single HTTP session object 811 may be related to multiple portal session objects 821, 821, which store user-specific session data for a plurality of user-specific Web content (e.g., Web pages) generated during the session. When a user logs in to a Web server, for example, multiple user-specific Web pages may be generated in response to client requests and opened in different windows of the client's Web browser. Thus, a single HTTP session object 811 is managed within the Web container 840 and separate portal session data related for each individual window of the user's browser is stored within the portal session objects 820-821. Said another way, the HTTP session object 811 manages session data related to the entire user session with the application server, whereas the portal session objects store session data for specific pages generated during the session (e.g., "My Yahoo" pages on the "Yahoo" Website).

Figure 8:
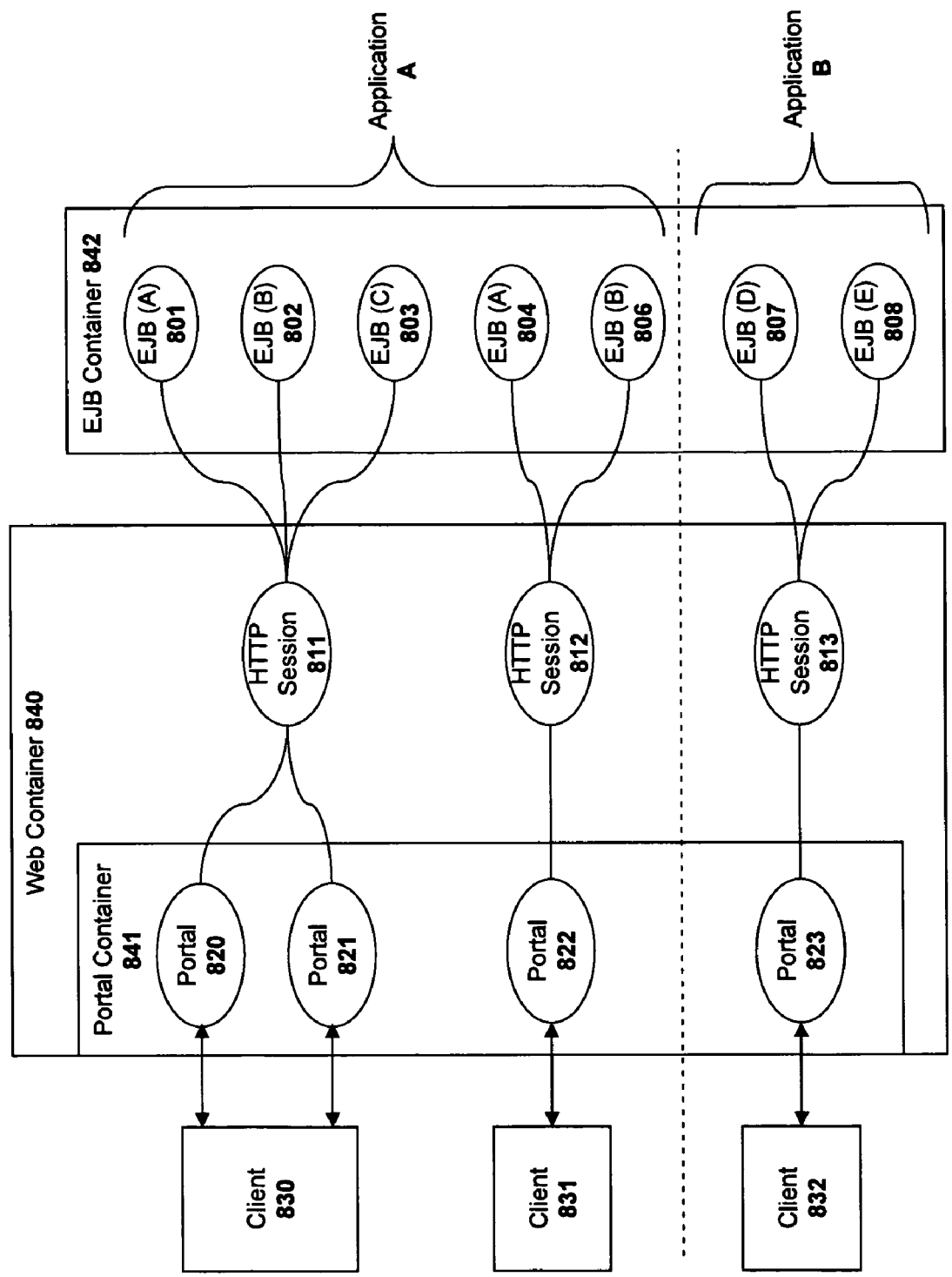
FIG. 8 illustrates an exemplary set of session objects.
Figure 9A:
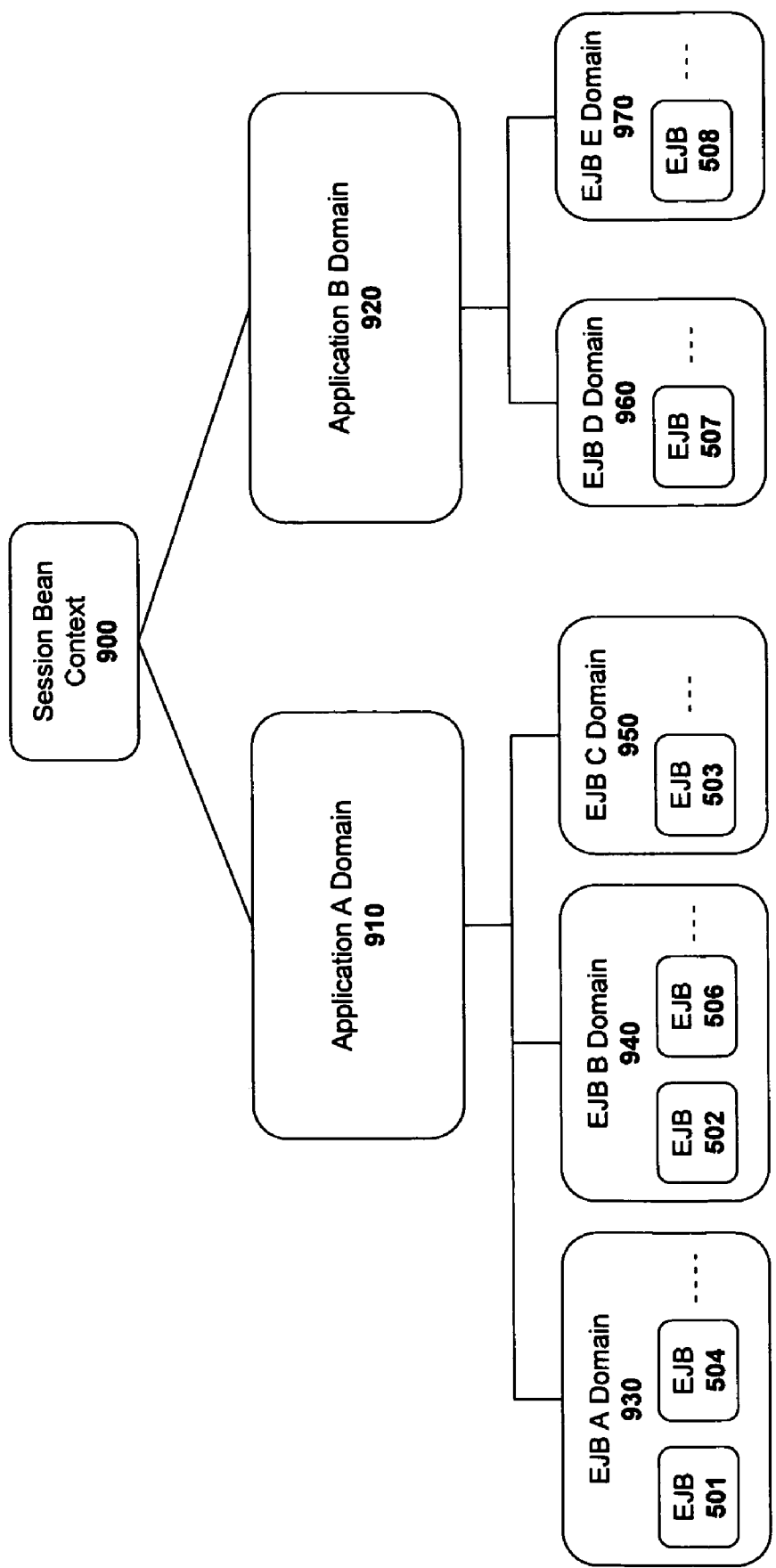
FIG. 9a illustrates hierarchical session domains for the session object in FIG. 8.
Figure 9B:
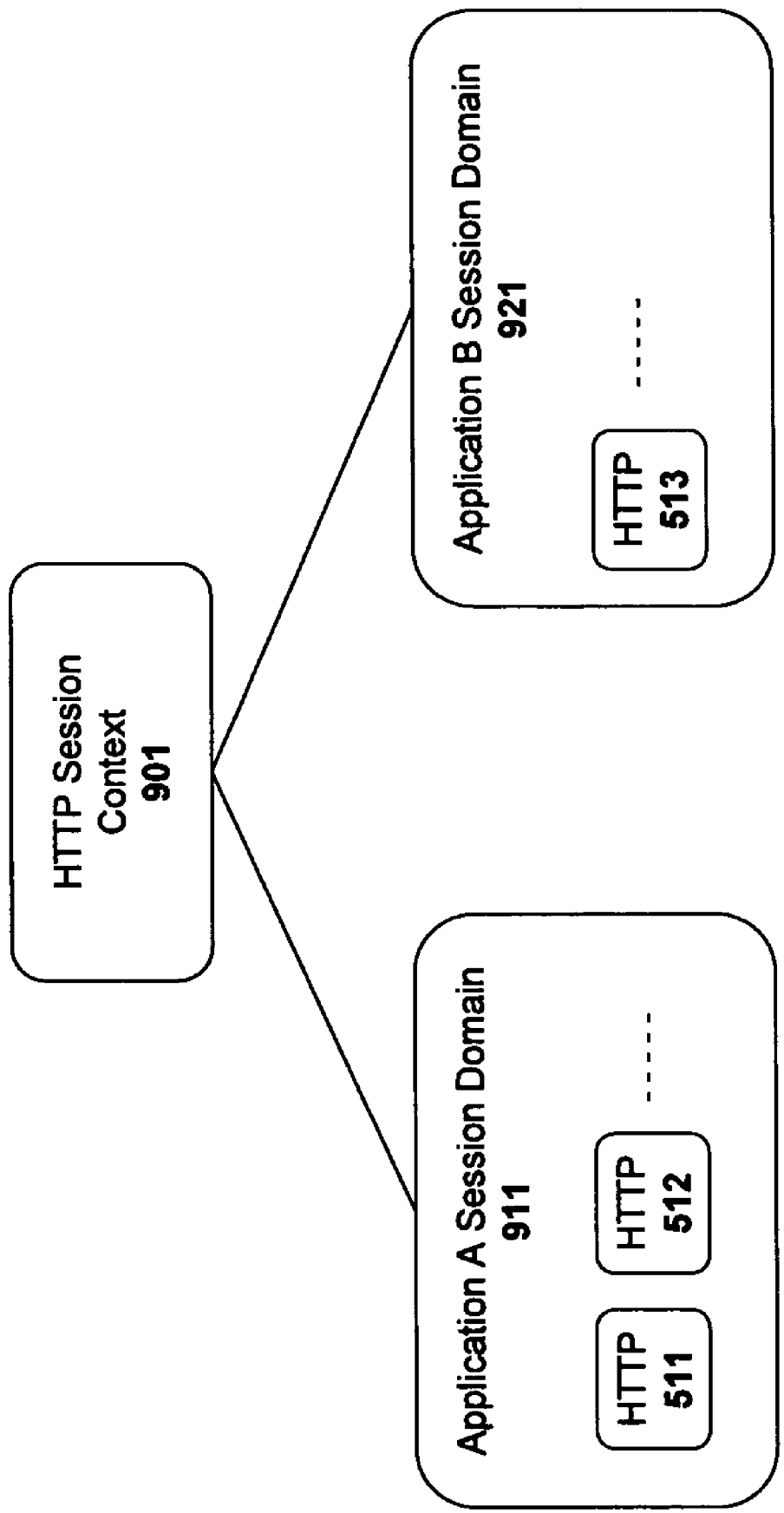
FIG. 9b illustrates session domains for an HTTP session context.

As illustrated in FIGS. 9*a-c*, each different type of session object shown in FIG. 8 is managed within a session domain under a different context. For example, as illustrated in FIG. 9*a*, separate session domains 910 and 920, are maintained for applications A and B, respectively, under session bean context 900. A separate EJB session domain is used to store and manage session instances for each session bean of each application. For example, under the application A session domain 910, session domain 930 associated with EJB A stores session objects 501, 504 which are instances of session bean A; session domain 940 associated with EJB B stores session objects 502, 506 which are instances of session bean B; and session domain 950 associated with EJB C stores session objects 503 which are instances of session bean C. Similarly, under the application B session domain 920, session domain 960 associated with EJB D stores session objects 507 which are instances of session bean D, and session domain 970 associated with EJB E stores session objects 508 which are instances of session bean E. Thus, all session beans are managed under the same session bean context 900 and grouped under application-specific and bean-specific session domains, thereby simplifying the management and configuration of similar session objects.

As illustrated in FIG. 9*b*, separate HTTP session domains 911 and 921 associated with applications A and B, respectively, are managed under an HTTP session context 901. The HTTP session domains store session data associated with each applications' HTTP sessions. For example, HTTP session objects 511 and 512 are stored within the session domain 911 for application A, and HTTP session object 513 is stored within the session domain 921 for application B.

In addition, in one embodiment, illustrated in FIG. 9*c*, separate portal session domains 912 and 922 associated with applications A and B, respectively, are managed under an application portal session context 902. The portal session domains store portal session objects containing portal data associated with each application. Specifically, portal session objects 820-822 are stored under the portal session domain 912 for application A, and portal session object 823 is stored under the session domain 922 for application B.

Figure 10:
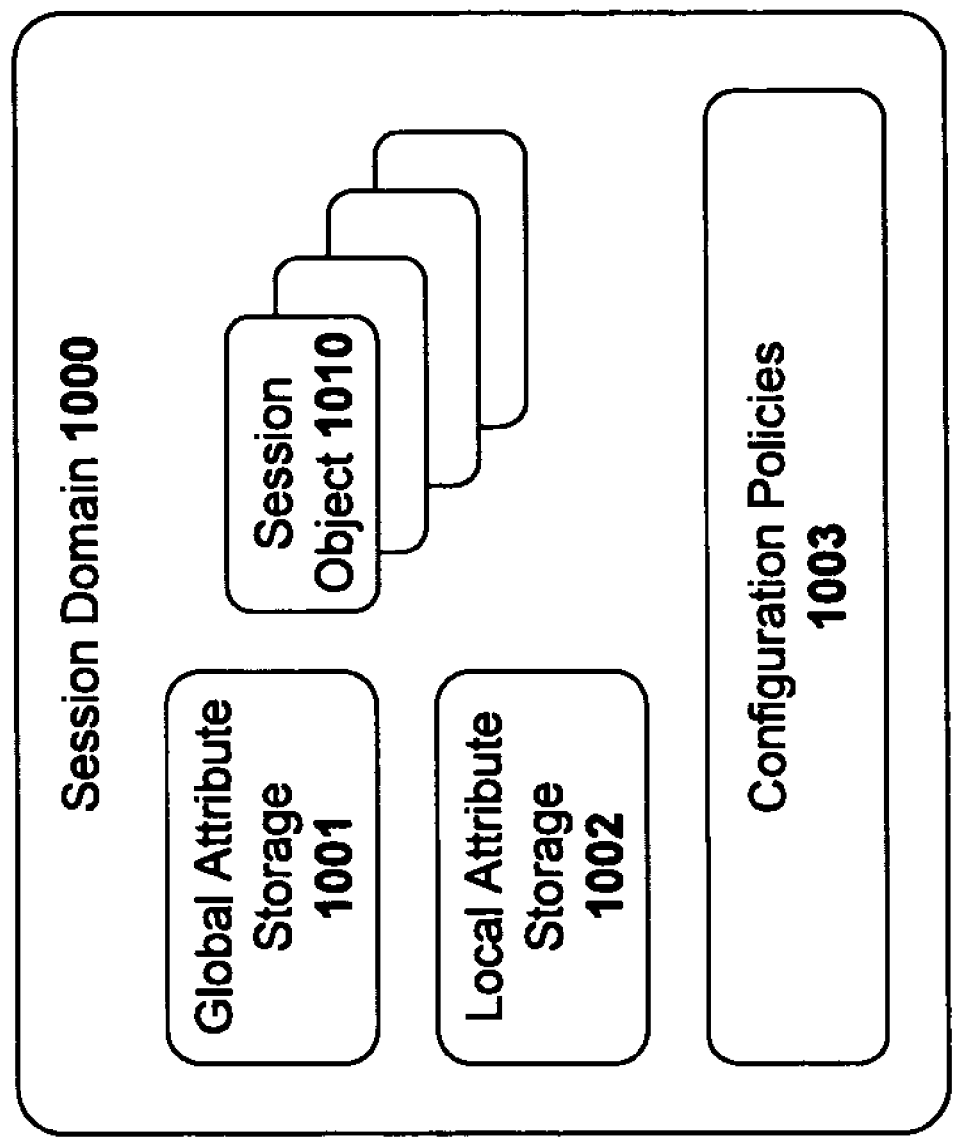
FIG. 10 illustrates data contained within one embodiment of a session domain.

FIG. 10 illustrates additional details related to the configuration of each session domain 1000 according to one embodiment of the invention. Specifically, each session domain 1000 includes a set of configuration policy objects 1003, a set of local storage attributes 1002 and a set of global storage attributes 1001.

The configuration policy objects 1003 define the behavior of each session domain. In one embodiment, the configuration policies implemented by the policy objects include, but are not limited to, a "thresholds" policy for setting limits on the number of sessions objects which are stored within each domain. For example, one session object may be joined to one or more session requests based on the thresholds policy. In addition, In one embodiment, a session access policy is implemented which allows the application or other entity which created the session domain (the "domain owner") to restrict or otherwise influence session access. For example, the domain owner may prevent multithreaded session access via the session access policy. In one embodiment, the configuration policy 1003 further includes a session invalidation policy which defines the behavior of the session object in the case of session invalidation. For example, as described in greater detail below, in one embodiment, transparent session objects are employed under certain conditions. Moreover, inactive sessions may be stored to persistent storage (e.g., the database or file system) and reactivated at a later time in response to subsequent requests.

In one embodiment, a persistence policy is also implemented within the configuration policy objects 1003 to define whether persistent storage should be used and, if so, the particular type of persistent storage that should be used. Session persistence types may include, but are not limited to, in-memory session persistence (i.e., session objects within the domain are stored within the memory of a single process); in-memory replication persistence (i.e., session object state is stored within a server process memory and is replicated to other server processes); database-based persistence (i.e., the session objects are stored in the database and may be shared across server processes); file system persistence (i.e., sessions are stored within a directory of the file system and can be shared across processes); and cookie-based persistence (i.e., session data is stored within the client in a cookie). It should be noted, however, that the underlying principles of the invention are not limited to any particular set of configuration properties.

Returning to FIG. 10, the global storage attributes 1001 of each session domain 1000 define attributes of the session domain which are shared across different virtual machines (e.g., different instances of the session domain implemented on different virtual machines). For example, the global session attributes may specify that all sessions within the particular domain 1000 have the same expiration time (e.g., become inactive/invalid after a period of non-responsiveness from a client). By way of another example, EJB application descriptors may be parsed once and shared between each of the EJB domains located under the session bean context 900, and Web application descriptors may be parsed only once and shared between each of the session objects located under the HTTP session context 901. In one embodiment, global storage attributes are used only in a shared memory implementation (i.e., in which virtual machines 321-325 share session objects via shared memory 340-341 as described herein). In one embodiment, global attributes are identified in shared memory using a unique global attribute name.

The local storage attributes 1002 of the session domain define session attributes which are specific to each individual virtual machine (i.e., they are container-specific). For example, if a particular virtual machine relies on a socket connection to a particular remote server, then this information may be provided within the local storage attributes. Local storage attributes may also include specific references to files within the file system/database and specific references to database connections. In an embodiment which does not employ a shared memory implementation, all attributes of the session domain 1000 are stored within the local storage attributes 1002.

The different containers can use the local storage attributes 1002 to keep certain attributes banded to each concrete server process. For example the HttpSession includes the method javax.servlet.ServletContext getServletContext( ). However, ServletContext can not be shared between different virtual machines because it maintains references to different resources that are local for the concrete server process. Thus, to enable the application to retrieve the ServletContext from the HttpSession, the Web container binds the ServletContext as a local attribute for the session domain. The getServletContext( ) method is implemented to provide a lookup of this attribute from the SessionDomain. Using this technique, the getServletContext( ) will return different objects based on the server process where the session is activated.

Sessions and caches are very important objects which may consume a significant amount of memory. Thus, it is important to have the ability to observe session and cache object networks without the semantics of the represented data. Accordingly, one embodiment of the invention uses the object graph processing techniques described herein for generating session and cache object graphs and extracting associated data. For example, in one embodiment, object graphs are generated to represent the hierarchical session domains described above.

Figure 11:
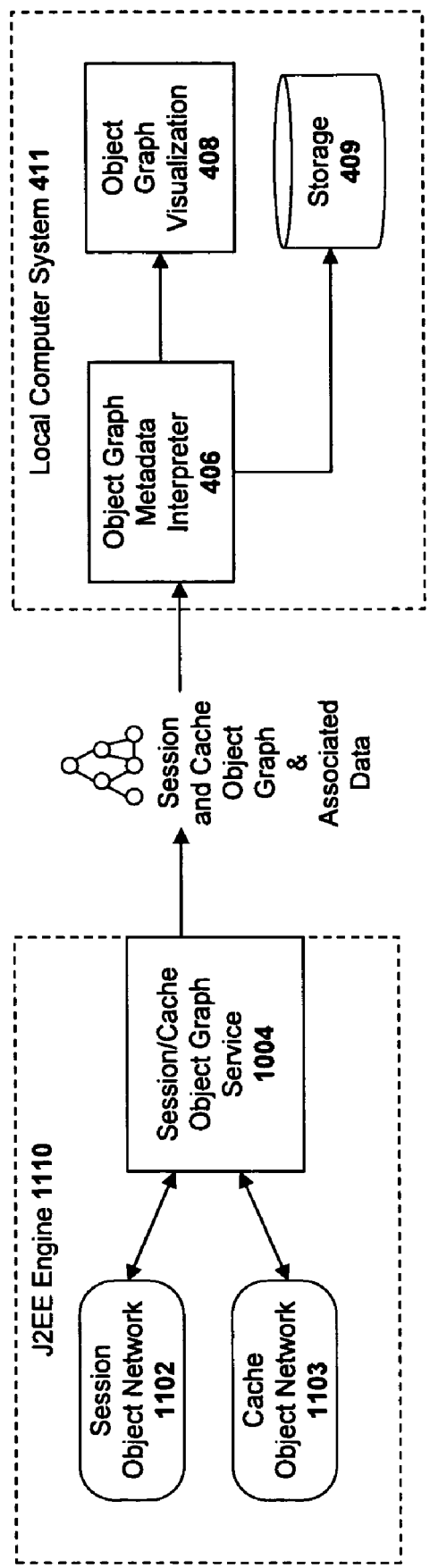
FIG. 11 illustrates a session/cache object graph service employed in one embodiment of the invention.

FIG. 11 illustrates one embodiment of an architecture for performing these operations. This embodiment includes a session/cache object graph service 1004 for generating object graph data related to the session object network 1102 and a cache object network 1103. In this embodiment, both the session object network 1102 and the cache object network 1103 are executed within a J2EE engine 1110. As in the prior embodiments (described above with respect to FIG. 4) a local computer system 411 requests object graph information related to the session object network 1102 and/or the cache object network 1103. The session/cache object graph service 1004 extracts information from the session object network 1102 and the cache object network 1103 to generate an object graph representing the networks as well as the other types of data described herein (e.g., memory size, type, each object's identification code, etc). The object graph and other data are then serialized and transmitted over a network to the requesting computer system 411.

Object graph interpreter logic 406 on the requesting computer system 411 interprets the serialized session/cache object graphs and other data to graphically display the results within a the visualization tool 408. As in the prior embodiments, the object graph and other data may be stored within a storage medium 409 such as a file system or database for later retrieval and viewing. The techniques described above are particularly useful when working with session and cache object networks because these networks/objects may tend to become very large and lead to undesirable memory consumption.

D. Using Object Graphs to Analyze Memory Consumption

Every object within an object-oriented computer program consumes a different amount of a computer's memory. Even objects of the same type can consume different amounts. For example, in a rental car reservation system, if two different people book cars, the object for the person with the longest name will consume more memory for its data presentation. Moreover, the fact that objects may reference other objects makes the problem of measuring memory consumption more difficult. In the foregoing example, each "booking" object holds references to the "person" and "car" objects related to the bookings. Consequently, one object (reservation) holds references to two other objects (person and car). This gets even more complicated when two objects are referencing each other. For example, in an implementation for managing human resources, each "manager" object holds references for its "employer" objects and every "employer" object holds references to its "manager" objects.

In one embodiment of the invention, to address the foregoing situations, the "characteristic" data for each object is identified (which is not referenced directly by other objects) and the memory difference between the "characteristic" data is measured. In one embodiment, the objects and their references are represented as math graph structures, generated as described above.

Figure 12B:
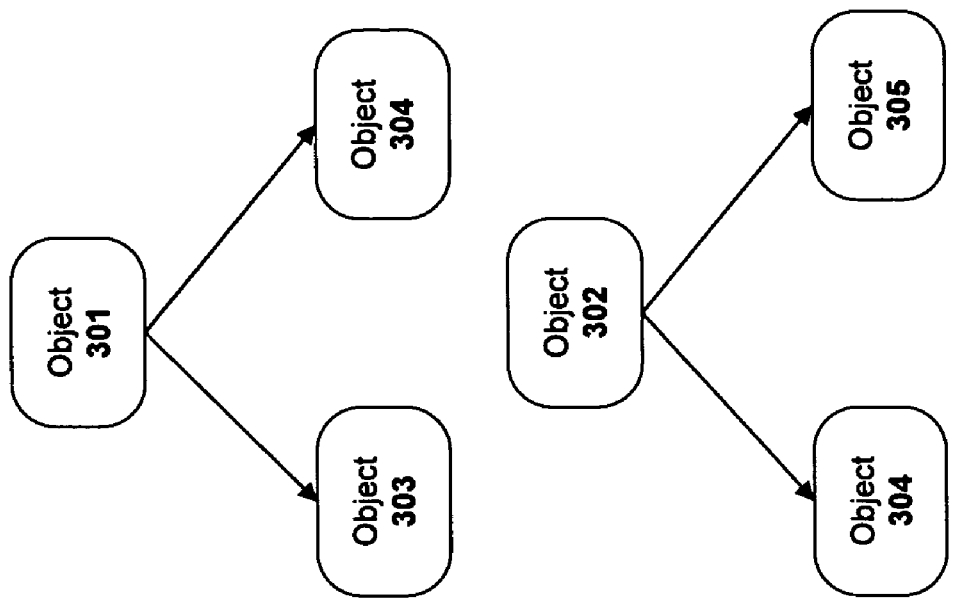
FIGS. 12a-c illustrate a method for measuring differences in memory consumption between objects.
Figure 12A:
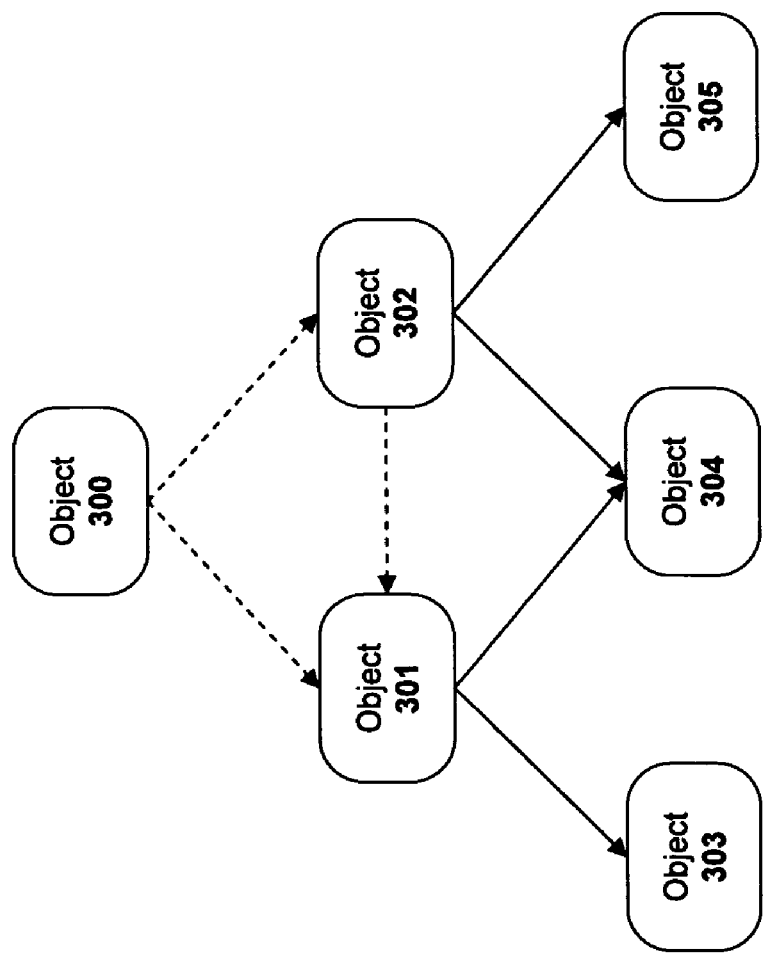

FIG. 12*a* illustrates an example using the object relationships previously illustrated in FIG. 3. In this example, an attempt will be made to measure the difference in memory consumed between nodes 301 and 302. Node 302 references node 305 which is characteristic data for it, and node 301 references node 303 that is not referenced directly from node 302. As a result, the memory consumption difference between node 302 and node 301 is the difference between node 305 and node 303 and the difference of the memory taken by node 302 and node 301 themselves.

Figure 12C:
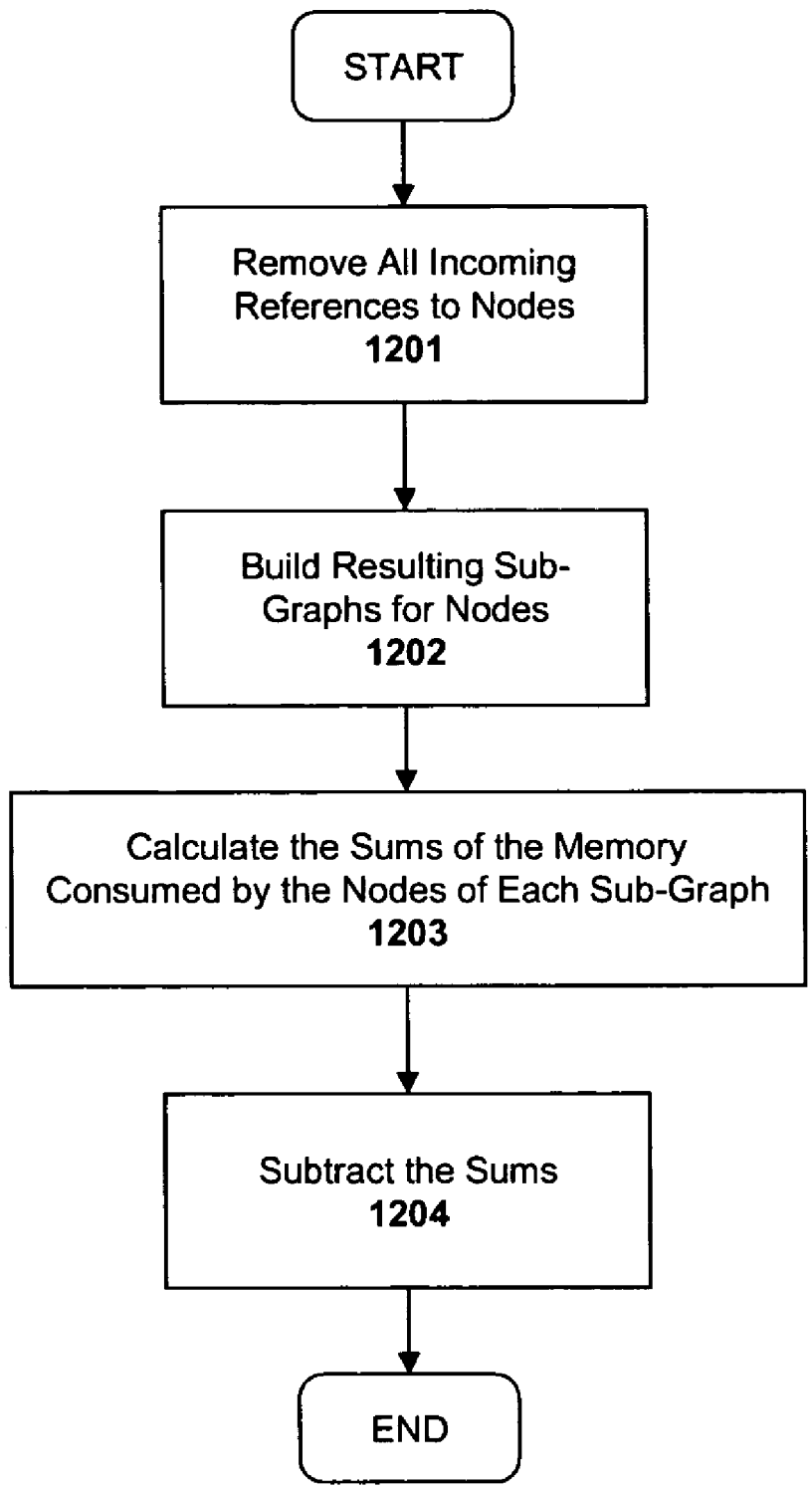

One embodiment of a method for measuring the memory consumption difference between two nodes is illustrated in FIG. 12*c*. At 1201 all incoming references to both nodes are removed. This is indicated in FIG. 12*a* by arrows with dotted lines. At 1202, the resulting sub-graphs are built from both nodes, as indicated in FIG. 12*b*. At 1203, the sum of the memory consumed by each node in the sub-graph is calculated for both sub-graphs. In one embodiment, this is calculated by summing the weights of the node and it's children. By way of example, the memory consumption of node 301 is equal to the combined memory consumption of nodes 301, 303 and 304. Similarly, the memory consumption of node 302 is the is equal to the combined memory consumption of nodes 302, 304 and 304. At 1204, the difference between the sums of the memory consumption for nodes 301 and 302 is calculated by subtracting the sums. In other words delta (301,302) =nativeSize(301)+nativeSize(303)+nativeSize(304)−nativeSize(302)−nativeSize(304)−nativeSize(305), or delta (301, 302)=nativeSize(301)+nativeSize(303)−nativeSize(302)−nativeSize(305). As mentioned above, in one embodiment, the following weights of the generic types of the nodes are used: boolean=1 byte; byte=1 byte; char=2 bytes; short=2 bytes; int=4 bytes; long=8 bytes; float=4 bytes; and double=8 bytes.

Using the foregoing techniques, the difference between the memory consumed by two objects may be determined and, more specifically, the difference between "unique" parts of memory consumed by these objects. In many cases, the object graph is so complex that each node references directly or indirectly (e.g., through a child) any other node. In these cases, while it is not possible to say in general which node takes less memory, the "delta" measure between the two nodes may still be used.

By way of example, in FIG. 3, node 302 holds memory of node 303 because it has a reference to 302 which has reference to 303. It also holds a reference to node 305. The delta between these two objects 301 and 302 depends more on the size of object 303 minus the size of object 305. This, if 301 is bigger using the delta function we will examine its graph and determine that it is because of node 303. Consequently, optimizing its memory (for node 303) will lead to optimizing the memory taken by 301 and 302.

Figure 13:
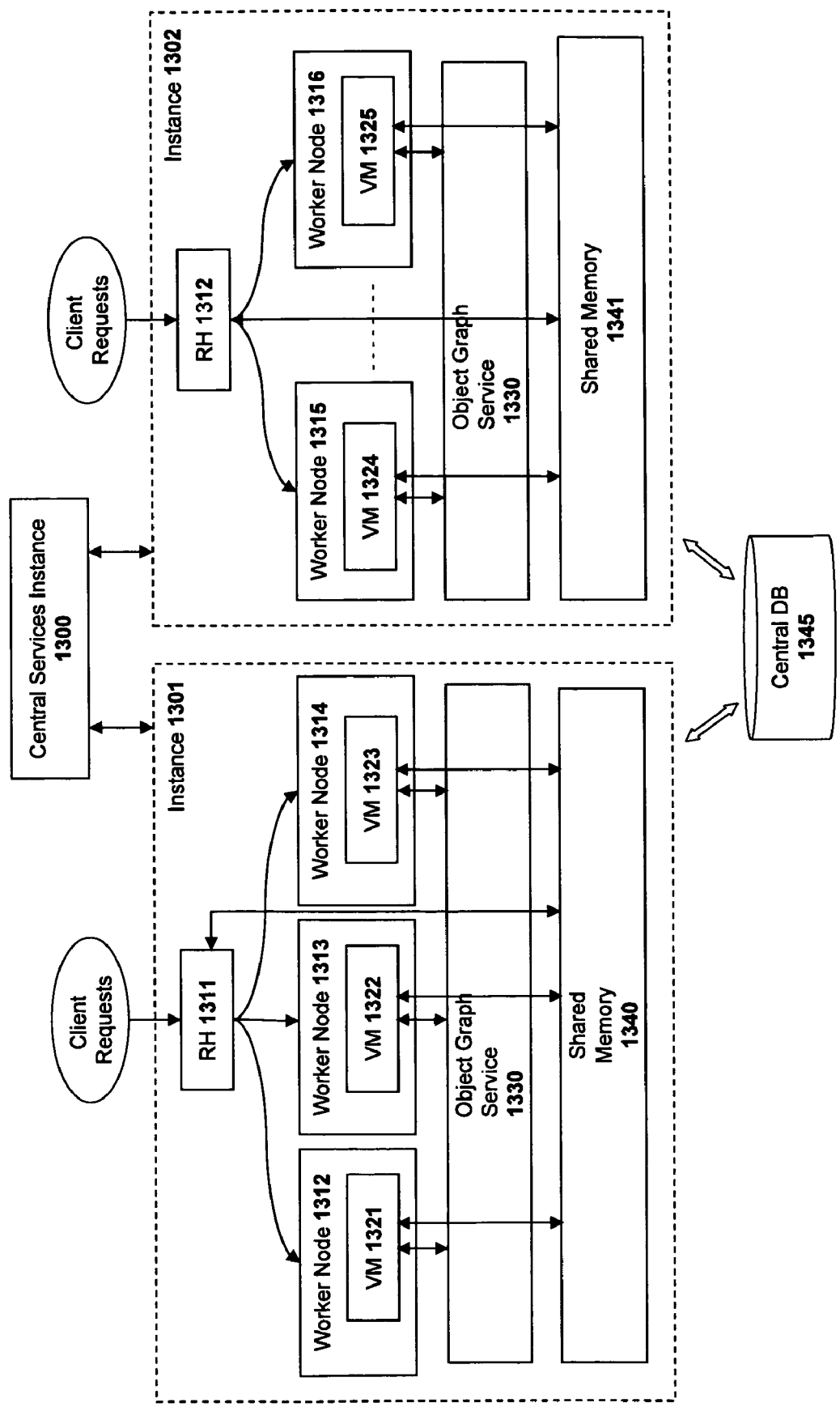
FIG. 13 illustrates an application server architecture according to one embodiment of the invention.

A system architecture on which embodiments of the invention may be implemented is illustrated in FIG. 13. The architecture includes a plurality of application server "instances" 1301 and 1302. The application server instances 1301 and 1302 each include a group of worker nodes 1312-1314 and 1315-1316 (also sometimes referred to herein as "server nodes"), respectively, and a dispatcher 1311 and 1312, respectively. The application server instances 1301,1302 communicate through a central services instance 1300 using message passing. In one embodiment, the central services instance 1300 includes a locking service and a messaging service (described below). The combination of all of the application server instances 1301 and 1302 and the central services instance 1300 is referred to herein as a "cluster." Although the following description will focus solely on instance 1301 for the purpose of explanation, the same principles apply to other instances within the cluster.

The worker/server nodes 1312-1314 within instance 1301 provide the business and presentation logic for the network applications supported by the system including, for example, the Web container 211 and the EJB container 201 functionality described herein. Each of the worker nodes 1012-1014 within a particular instance may be configured with a redundant set of programming logic and associated data, represented as virtual machines 1321-1323 in FIG. 13. In one embodiment, the dispatcher 1311 distributes service requests from clients to one or more of the worker nodes 1312-1314 based on the load on each of the servers. For example, in one embodiment, the dispatcher maintains separate queues for each of the worker nodes 1312-1314 in a shared memory 1340. The dispatcher 1311 fills the queues with client requests and the worker nodes 1312-1314 consume the requests from each of their respective queues. The client requests may be from external clients (e.g., browser requests) or from other components/objects within the instance 1301 or cluster.

In one embodiment, the worker nodes 1312-1314 may be Java 2 Enterprise Edition ("J2EE") worker nodes which support Enterprise Java Bean ("EJB") components and EJB containers (at the business layer) and Servlets and Java Server Pages ("JSP") (at the presentation layer). In this embodiment, the virtual machines 1321-1325 implement the J2EE standard (as well as the additional non-standard features described herein). It should be noted, however, that certain high-level features described herein may be implemented in the context of different software platforms including, by way of example, Microsoft .NET platforms and/or the Advanced Business Application Programming ("ABAP") platforms developed by SAP AG, the assignee of the present application.

As indicated in FIG. 13, a object graph processing service 1330 such as the one described above may be executed across each of the instances 1301, 1302. In one embodiment, the object graph processing service 1330 implements the various object graph processing techniques described herein.

In one embodiment, communication and synchronization between each of the instances 1301, 1302 is enabled via the central services instance 1300. As mentioned above, the central services instance 1300 includes a messaging service and a locking service. The message service allows each of the servers within each of the instances to communicate with one another via a message passing protocol. For example, messages from one server may be broadcast to all other servers within the cluster via the messaging service (e.g., such as the cache configuration messages described below). Alternatively, messages may be addressed directly to specific servers within the cluster (i.e., rather than being broadcast to all servers). In one embodiment, the locking service disables access to (i.e., locks) certain specified portions of configuration data and/or program code stored within a central database 1345. The locking service locks data on behalf of various system components which need to synchronize access to specific types of data and program code. In one embodiment, the central services instance 1300 is the same central services instance as implemented within the Web Application Server version 6.3 and/or 6.4 developed by SAP AG. However, the underlying principles of the invention are not limited to any particular type of central services instance.

In addition, unlike prior systems, one embodiment of the invention shares objects across virtual machines 1321-1325. Specifically, in one embodiment, objects such as session objects which are identified as "shareable" are stored within a shared memory region 1340, 1341 and are made accessible to multiple virtual machines 1321-1325. Creating new object instances from scratch in response to client requests can be a costly process, consuming processing power and network bandwidth. As such, sharing objects between virtual machines as described herein improves the overall response time of the system and reduces server load.

In a shared memory implementation, a shared memory area 1340, 1341 or "heap" is used to store data objects that can be accessed by multiple virtual machines 1321-1325. The data objects in a shared memory heap should generally not have any pointers or references into any private heap (e.g., the private memory regions/heaps of the individual virtual machines). This is because if an object in the shared memory heap had a member variable with a reference to a private object in one particular virtual machine, that reference would be invalid for all the other virtual machines that use that shared object.

More formally, this restriction can be thought of as follows: For every shared object, the transitive closure of the objects referenced by the initial object should only contain shared objects at all times. Accordingly, in one implementation of the invention, objects are not put into the shared memory heap by themselves—rather, objects (such as the scheduling analysis module 402 and scheduling file 404 described above) are put into the shared memory heap in groups known as "shared closures." A shared closure is an initial object plus the transitive closure of all the objects referenced by the initial object.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMS, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, although many of the embodiments set forth above relate to a Java or J2EE implementation, the underlying principles of the invention may be implemented in virtually any enterprise networking environment. Moreover, although some of the embodiments set forth above are implemented within a shared memory environment, the underlying principles of the invention are equally applicable to a non-shared memory environment.

Accordingly, the scope and spirit of the invention should be judged in terms of the claims which follow.

What is claimed is:

1. A computer-implemented method for measuring the memory consumption difference between two objects in an object-oriented programming environment comprising:
    processing program code in a processor to perform the operations of:
    analyzing relationships between objects within a network of objects to determine an object network structure;
    generating object graph data representing the object network structure, the object graph data including nodes representing objects and references representing relationships between objects;
    building sub-graphs by removing all incoming references to each of two nodes, resulting in a first sub-graph associated with a first of the two nodes and a second sub-graph associated with a second of the two nodes, each sub-graph including nodes representing objects and references representing relationships being objects;
    summing a first amount of memory consumed by the first node associated with the first sub-graph and a second amount of memory consumed by the second node associated with the second sub-graph; and
    calculating the memory consumption difference between the first memory consumption amount and the second memory consumption amount to determine a memory consumption difference between the two nodes.

2. The method as in claim 1 wherein each of the nodes comprises one or more generic types and wherein summing the memory consumption amounts comprises adding weighted values associated with generic types employed by the nodes in each of the sub-graphs.

3. The method as in claim 2 wherein the generic types include one or more of the following: Boolean, byte, char, short, int, long, float, and double.

4. The method as in claim 3 wherein the following weights are used for one or more of the generic types: boolean=1 byte; byte=1 byte; char=2 bytes; short=2 bytes; int=4 bytes; long=8 bytes; float=4 bytes; and double=8 bytes.

5. The method as in claim 1 further comprising:
    displaying the object graph data related to an object in response to selection of a graphic representing the object on a requesting computer.

6. The computer-implemented method as in claim 1 wherein the object graph data comprises a list structure.

7. The computer-implemented method as in claim 1 further comprising:
    assigning each object within the network a unique identification code; and
    serializing the identification codes and transmitting the identification codes over a network.

8. A computer system having at least one memory for storing program code and at least one processor for processing the program code to perform the operations of:
    analyzing relationships between objects within a network of objects to determine an object network structure;
    generating object graph data representing the object network structure, the object graph data including nodes representing objects and references representing relationships between objects;
    building sub-graphs by removing all incoming references to each of two nodes, resulting in a first sub-graph associated with a first of the two nodes and a second sub-graph associated with a second of the two nodes, the first sub-graph comprising the first of the two nodes and its child nodes and the second sub-graph comprising the second of the two nodes and its child nodes;
    summing a first amount of memory consumed by the first node and its child nodes associated with the first sub-graph and a second amount of memory consumed by the second node and its child nodes associated with the second sub-graph; and
    calculating the memory consumption difference between the first memory consumption amount and the second memory consumption amount to determine a memory consumption difference between the two nodes.

9. The system as in claim 8 wherein each of the nodes comprises one or more generic types and wherein summing the memory consumption amounts comprises adding weighted values associated with generic types employed by the nodes in each of the sub-graphs.

10. The system as in claim 9 wherein the generic types include one or more of the following: Boolean, byte, char, short, int, long, float, and double.

11. The method as in claim 10 wherein the following weights are used for one or more of the generic types: boolean=1 byte; byte=1 byte; char=2 bytes; short=2 bytes; int=4 bytes; long=8 bytes; float=4 bytes; and double=8 bytes.

12. The system as in claim 8 comprising additional program code to cause the processor to perform the operations of:
    displaying the object graph data related to an object in response to selection of a graphic representing the object on a requesting computer.

13. The system as in claim 8 wherein the object graph data comprises a list structure.

14. The system as in claim 8 comprising additional program code to cause the processor to perform the operations of:
    assigning each object within the network a unique identification code; and
    serializing the identification codes and transmitting the identification codes over a network.

15. A machine-readable medium having program code stored thereon which, when executed by a machine, causes the machine to perform the operations of:
    analyzing relationships between objects within a network of objects to determine an object network structure;
    generating object graph data representing the object network structure, the object graph data including nodes representing objects and references representing relationships between objects;
    building sub-graphs by removing all incoming references to each of two nodes, resulting in a first sub-graph associated with a first of the two nodes and a second sub-graph associated with a second of the two nodes, the first sub-graph comprising the first of the two nodes and its child nodes and the second sub-graph comprising the second of the two nodes and its child nodes;

summing a first amount of memory consumed by the first node and its child nodes associated with the first sub-graph and a second amount of memory consumed by the second node and its child nodes associated with the second sub-graph; and calculating the memory consumption difference between the first memory consumption amount and the second memory consumption amount to determine a memory consumption difference between the two nodes.

16. The machine-readable medium as in claim 15 wherein each of the nodes comprises one or more generic types and wherein summing the memory consumption amounts comprises adding weighted values associated with generic types employed by the nodes in each of the sub-graphs.

17. The machine-readable medium as in claim 16 wherein the generic types include one or more of the following: Boolean, byte, char, short, int, long, float, and double.

18. The method as in claim 17 wherein the following weights are used for one or more of the generic types: boolean=1 byte ; byte=1 byte ; char=2 bytes; short=2 bytes; int=4 bytes; long=8 bytes; float=4 bytes; and double=8 bytes.

19. The machine-readable medium as in claim 15 comprising additional program code which, when executed by the machine, cause the machine to perform the operations of:

displaying the object graph data related to an object in response to selection of a graphic representing the object on a requesting computer.

20. The computer-implemented machine-readable medium as in claim 15 wherein the object graph data comprises a list structure.

21. The computer-implemented machine-readable medium as in claim 15 comprising additional program code which, when executed by the machine, causes the machine to perform the operations of:

assigning each object within the network a unique identification code; and serializing the identification codes and transmitting the identification codes over a network.

* * * * *